United States Patent [19]

Nakaguchi et al.

[11] 3,714,202
[45] Jan. 30, 1973

[54] VINYL GLYCEROL ACETALS

[76] Inventors: Glenn M. Nakaguchi; Ting-I Wang, both of Fullerton; Frederick F. Caserio, Jr., Laguna Beach, all of Calif.

[73] Assignee: Atlantic Richfield Company, Philadelphia, Pa.

[22] Filed: July 15, 1969

[21] Appl. No.: 841,983

[52] U.S. Cl................................260/340.7, 260/340.7
[51] Int. Cl. ..............................................C07d 13/04
[58] Field of Search........................260/340.7, 340.9

[56] References Cited

UNITED STATES PATENTS 2,413,249   12/1946   Senkus..............................260/340.7
2,636,884   4/1953    Tenebaum et al..................260/340.9

FOREIGN PATENTS OR APPLICATIONS 1,078,117   8/1967   Great Britain......................260/340.7

Primary Examiner—Donald G. Daus
Assistant Examiner—James H. Turnipseed
Attorney—Donald W. Canady

[57] ABSTRACT

Two classes of vinyl cyclic acetal compounds, 2-methyl-5-vinyloxy-1,3-dioxane and 2-methyl-4-vinyloxymethyl-1,3-dioxolane in particular, and a process for preparing compounds of these classes by catalytic pyrolysis are disclosed.

6 Claims, No Drawings

VINYL GLYCEROL ACETALS

BACKGROUND OF THE INVENTION

1. Field of the Invention

This invention relates to the preparation of vinyl cyclic acetals and to the compounds prepared. More particularly, this invention relates to a process using catalytic pyrolysis of glycerol dimers to produce vinyloxy dioxanes and dioxolanes. Specifically, this invention relates to the preparation of 2-methyl-5-vinyloxy-1,3-dioxane and 2-methyl-4-vinyloxymethyl-1,3-dioxolane by catalytic pyrolysis of glycerol acetal dimers produced by the addition reaction of 1,1-dialkoxyethane or acetaldehyde with glycerol.

2. Description of the Prior Art

Vinyl monomers, polymerization processes for the same, and vinyl polymers are, of course, well known and are important articles of technology and commerce. Vinyl polymerization products have been the subject of exhaustive study, see, e.g., Smith, VINYL RESINS, Reinholdt, New York, 1958 and D'Alelio, FUNDAMENTAL PRINCIPLES OF POLYMERIZATION, John Wiley, New York 1952, and the kinetics of vinyl polymerization is well known, see, e.g., Barnford et al, THE KINETICS OF VINYL POLYMERIZATION BY RADICAL MECHANISMS, Academic Press, 1958.

Vinyl ethers, generally, are known to be valuable monomers for producing copolymers, e.g., with dialkyl maleates, see Yasuo Choshi, *Kogyo Kagoka Zasshi*, 68, 532–4 (1965).

Vinyl ethers may be polymerized according to conventional vinyl polymerization principles using either ionic or free radical polymerization catalysts. Vinyl cyclic acetals are, however, best polymerized using free radical catalysts, rather than ionic catalysts, since the latter class of catalysts tends to cleave the etheric part of the monomer molecule. Benzoyl peroxide, cumene hydroperoxide, t-butyl hydroperoxide and azo-bis-isobutyronitrile are used as free radical catalysts in the polymerization of vinyl cyclic acetals. Other catalytic polymerization processes may also be used; e.g., Lewis acid cationic, Ziegler-Natta, and Grignard catalyst systems are suitable for forming various polymeric materials from these monomers.

Vinyl cyclic acetals have been produced by the direct vinylation of the cyclic acetal, for example, the vinylation of dioxane has been reported by Shuikin et al, *Dakl. Akad. Nauk.* SSSR 158,692–3 (1964). Vinyl cyclic ethers have also been produced by the condensation of acrolein, or an alpha-substituted acrolein with a polyol, e.g., ethylene glycol, glycerol, etc., see Brachman, U.S. Pat. No. 3,014,924, see also Leopold and Michael, German Pat. No. 434,989 (1926). The production of cyclic acetals by the condensation of polyhydric alcohols with aldehydes is, of course, well known, see, e.g., Hoover, U. S. Pat. No. 1,934,309.

Polymers of vinyl cyclic acetals are known to be useful in the preparation of surface coating materials, Nordstrom, U.S. Pat. No. 3,389,112, and in solventless paint media, Hochberg, *J. Oil Color Chemists Assoc.* 48,1043 (1964). Polymers having hydrophilic groups thereon are known to be valuable in the production of fresh water by the hydration-dehydration cycling of resins, see Bloch, U.S. Pat. No. 3,234,125, Vinyl cyclic acetals have been shown to be valuable intermediates in the production of air drying coatings, sealants, film formers, etc., see Ikeda, U.S. Pat. Nos. 3,010,918, 3,010,923, 3,010,945, 3,053,792, 3,058,934, 3,197,484, 3,245,927 and 3,255,210.

The direct production of vinyloxy compounds has not, to our knowledge, been reported heretofore. It is, therefore, a principal object of this invention to provide a novel class of vinyloxy compounds useful as intermediates in forming polymeric and copolymeric materials capable of forming films, coatings, moldable and formable plastics, detergents, useful fluids, flocculent aids, cyclicly hydratable-dehydratable water purification media, etc.

SUMMARY OF THE INVENTION

The objects of this invention are accomplished, generally, by a three step process for producing vinyl cyclic acetals. In step one, 1,1-dialkyoxyethane is produced by catalytic oxidation of an ethylene-alcohol mixture. Polyol acetals dimers are produced in step two by the exchange reaction of 1,1-dialkoxyethane with a triol using an acid catalyst, such as p-toluenesulfonic acid or from acetaldehyde and a triol, using a like catalyst. The preparation of the vinyl cyclic ethers of this invention in step three involves the catalytic pyrolysis of the triol acetal dimers of step two to a mixture of vinyl cyclic acetals and triol acetals. The product, the vinyl glycerol acetals, is separated from the triol acetals by extraction with an alkane-polyol solvent system. The vinyl triol acetal mixture is recovered from pentane by distillation. The polyol layer containing the triol acetal is recycled as feed to step two.

An exemplary reaction scheme is given below:

First Step

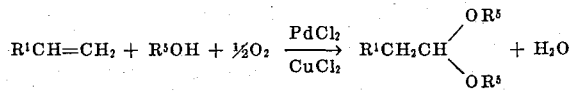

Second Step

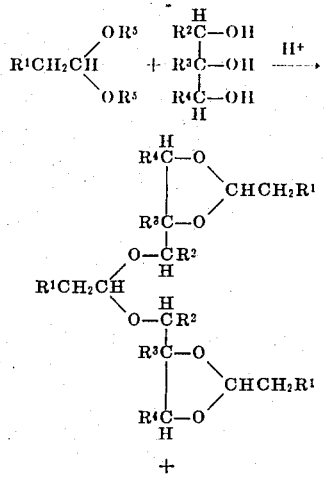

+

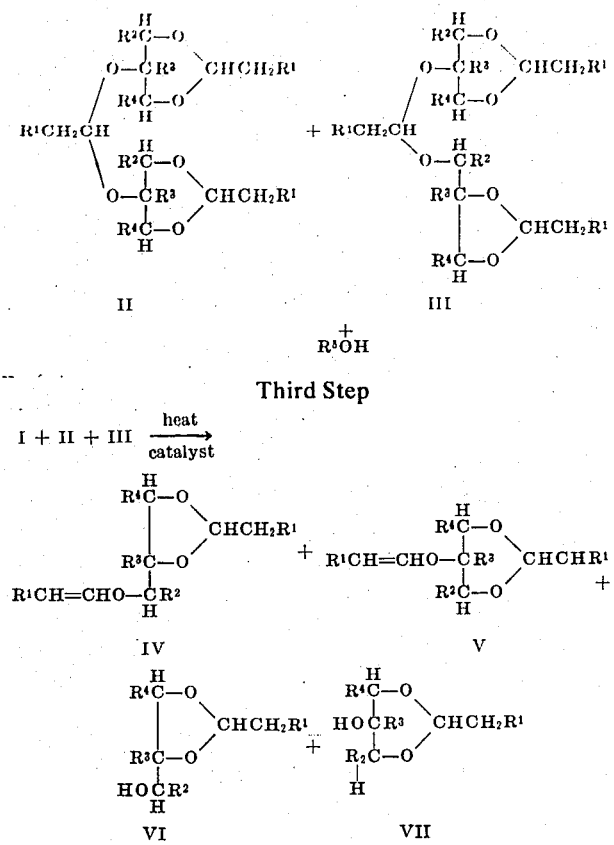

R¹ in the above equations, is preferably hydrogen, since the unsubstituted vinyl group in the final product is more reactive than substituted vinyl groups, but may be lower alkyl, e.g., methyl or ethyl, for producing substituted vinyl compounds. R², R³, and R⁴ are hydrogen or lower alkyl, e.g., methyl, ethyl, propyl, etc., groups. R⁵ is preferably methyl or ethyl but may be any lower alkyl, aryl, or aralkyl group which is sufficiently soluble in polar media to permit efficient reaction with a polyglycol. In step two, 1,1-dialkoxyethane is preferred but acetaldehyde reacts in the same manner to produce the same compounds I, II, and III.

It is, therefore, a principal object of this invention to provide novel vinyl cyclic acetal compounds and a process for preparing the same.

It is a more specific object of this invention to provide a class of vinyloxydioxanes and vinyloxydioxolanes as polymerization monomers.

A further specific object of the invention is to provide a novel process for producing vinyloxydioxanes and vinyloxydioxolanes.

A further and more specific object of the invention is to provide a novel method for producing 5-vinyloxydioxanes and 4-vinyloxymethyl dioxolane.

A further object of the invention is to provide compounds of the formulas

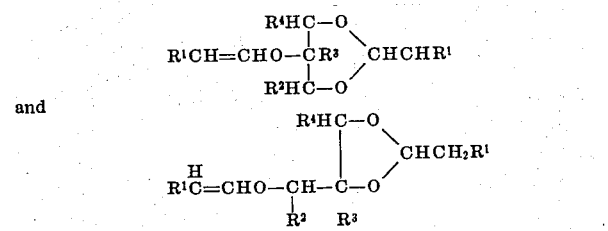

wherein R¹, R², R³ and R⁴ are hydrogen or lower alkyl groups.

An additional object is to provide a process for preparing the foregoing compounds simultaneously.

An additional and distinct object of the invention is to provide a process for separating vinyl cyclic acetals from polyol cyclic acetals.

A more specific object of the invention is to produce a method of separating vinyl cyclic acetals from free hydroxyl containing compounds using a polar-nonpolar solvent system.

An additional object of the invention is to provide a novel process for producing vinyl compounds by reacting an aldehyde or acetal with a polyglycol to produce cyclic acetals and catalytically pyrolyzing the cyclic acetal.

A highly specific and non-limiting object of the invention is to provide a method for simultaneously 2-methyl-5-vinyloxy-1,3-dioxane and 2-methyl-4-vinyloxymethyl-1,3-dioxolane.

Additional objects will be apparent from the discussion which follows.

DESCRIPTION OF THE PREFERRED EMBODIMENTS

The preferred embodiment of this invention comprises a three step process, although the first step may be omitted without significant detriment to the overall process.

The first step comprises the preparation of an acetal in either a one stage or a two stage operation. The acetal, 1,1-dialkoxyethane involves the reaction of ethylene with a lower alkyl alcohol, e.g., methanol, ethanol, propanol, etc. Methanol and ethanol are preferred.

The one stage operation involves passing a gaseous mixture of ethylene and oxygen through an alcoholic solution containing a catalyst system. The preferred catalyst system is a $PdCl_2$-$CuCl_2$ composite. $CuCl_2$ serves as a cocatalyst and aids in the regeneration of $PdCl_2$ which is reduced during the foregoing reaction.

The two stage operation involves, first, reacting ethylene with alcohol to form 1,1-dialkoxyethane with simultaneous reduction of the $PdCl_2$-$CuCl_2$ catalyst system and, secondly, regenerating the catalyst system with oxygen after the 1,1-dialkoxyethane has been removed by distillation. Obviously, the two reaction schemes are chemically identical, although the physical manipulations differ.

The first step reactions may be carried out at temperatures from about 50°C. to about 200°C., preferably between 75°C. and 100°C. under a pressure of from 1 to 100 atmospheres. Reaction times from a fraction of an hour to 10 or more hours may be used. The foregoing reaction conditions are preferred but variations in reaction conditions and catalysts may be made, e.g., according to the principles set forth in application Ser. No. 708,772, filed Feb. 28, 1968, by Glenn M. Nakaguchi and Frederick F. Caserio, Jr. abandoned in 1970, the disclosure of which is incorporated herein.

The second step of the reaction scheme is carried out by the exchange reaction of a 1,1-dialkoxyethane with a triol using an acid catalyst. Alternatively, the triol acetal dimers may be prepared from acetaldehyde and the triol under similar conditions. This alternative eliminates the first step if acetaldehyde is purchased or produced according to known methods, e.g., the Wacker process.

Similarly, 1,1-dialkoxypropanes and 1,1-dialkoxybutanes, etc., produce analogous compounds wherein R¹ is a lower alkyl group, rather than hydrogen. Likewise propionaldehyde or butyraldehyde may be used directly in the process, in substitution for acetaldehyde.

Polyglycols useful in the second step of the reaction include those polyols which have at least three reactive hydroxyl groups, for example, 1,2,6-hexanetriol, 1,3,6-hexanetriol, glycerol, sorbitol, pentaerythritol, diglycerol, 1,1,1-trimethylol propane and 1,4,7-heptanetriol and mixtures thereof. The preferred polyols are triols generally, for example glycerol, 1,1,1-trimethylol propane, 1,3,6-hexanetriol, 1,4,7-heptanetriol, etc. In addition, polymeric substances highly useful as wetting agents, flocculent aids, etc. may be polymerized from monomers produced according to the present invention starting with polyalkylene oxide ethers of polyols, e.g., glycerol having the following general structure:

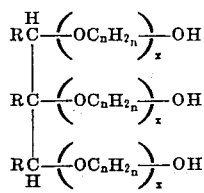

wherein R is hydrogen or a lower alkyl, $n$ is a positive integer from 1 to 3 and $x$ is a positive integer from 1 to 10, inclusive. Obviously, other polyalkylene oxide polyol ethers may likewise be used. Using the above product, wherein R is H and $n$ is 2, the following product would result in a reaction with 1,1-diethoxyethane after pyrolysis:

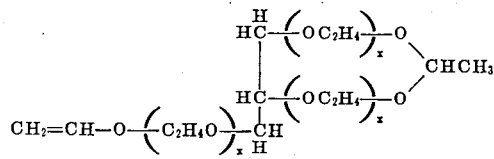

Vinylic polymerization of the above product will result in a low molecular weight, highly hydrophilic material.

Step two of the reaction scheme is carried out preferably with an organic acid catalyst, such as sulfosalicylic acid, para-toluene sulfonic acid, and acidic ion exchange resins, although any essentially acid catalyst is satisfactory. Reaction times range from about 1 hour to about 36 or more hours, reaction temperatures, in the preferred reaction process are largely controlled by the boiling point of the aldehyde or dialkoxy alkane derivative and range, generally, from about 50°C. to about 150°C. Pressures of from less than 1 atmosphere to about 100 atmospheres may be used, atmospheric pressure is preferred for convenience although sub-atmospheric pressures are expected to give slightly improved yields.

Step three involves the pyrolysis of the polyol acetal dimers from step two over a catalyst to form a mixture of vinyl cyclic acetals and glycerol acetals. Phosphates generally, acid catalysts, such as sodium dihydrogen phosphate and aluminum phosphate, silica gel, molecular sieves and charcoal are effective catalysts. The preferred catalyst is sodium dihyrogen phosphate. The reaction is preferably carried out in a flowing stream with a catalyst contact time of from about 1 to about 100 seconds, preferably in the range of about 10 seconds at a temperature of from 150°C. to 300°C. and preferably in the range of 175°C. to 250°C. Pressures from less than 1 atmosphere to about 10 atmospheres and, preferably, about 1 atmosphere are useable. The process variable limits have not, however, been determined with precision.

The reaction products, vinyl cyclic acetals and polyol cyclic acetals which contain at least one free hydroxyl group, e.g., glycerol cyclic acetal

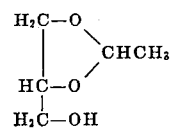

are separated from each other using a two phase polar-nonpolar solvent system. The nonpolar component may be a paraffinic, cycloparaffinic or olefinic. Butane (under suitable pressure), pentane, hexane, cyclohexane, hexene, cyclohexene, etc. are exemplary solvents. Benzene is less satisfactory for performing efficient separations, apparently being too polar, but alkyl benzenes such as butylbenzene, hexylbenzene, etc. are satisfactory as are the polyalkyl benzenes.

The polar component is a polyol and is preferably the same polyol (triol) used in step two of the reaction, e.g., glycerol, etc. This obviates the necessity of separating the polyol cyclic acetal from the polar solvent before recycle to step two. Pentane-glycerol, hexane-glycerol, and cyclohexane-glycerol systems are exemplary.

The reaction mixture is shaken with the polar-nonpolar solvent combination. The vinyl compounds predominate in the nonpolar phase and the hydroxyl containing acetals predominate in the polar phase. One separation is sufficient in most cases but successive steps may be used if desired.

The vinyl compounds are separated from the solvent by distillation and the polyol phase is recycled to step two, in the preferred embodiment. The polyol cyclic acetal may, however, be separated by distillation prior to being recycled.

EXPERIMENTAL

The step one reaction, the production of 1,1-dialkoxy-ethane by the one stage process, was carried out at 90°C. and 50 psig for 4 hours in an unstirred glass tube reactor 30 inches long and 1 inch in diameter. The catalyst mixture consisted of 0.004 mole palladium chloride and 0.15 mole of cupric chloride in 200 ml (5 moles) of methanol. Two reactions were performed using a 95 percent ethylene-5 percent oxygen gas mixture. One run gave a 6.4 percent conversion of ethylene with the following selectivities: dimethoxyethane, 85.2 percent; acetaldehyde, 10.6 percent; and methyl acetate, 4.2 percent. Another run gave a 7.6 conversion of ethylene with about the same selectivity. In another run, using a 90 percent ethylene-10 percent oxygen gas mixture and anhydrous cupric chloride in place of the dihydrate salt previously used, the ethylene conversion was 11.5 percent with little change in selectivity.

The same reaction was carried out in a two stage process. These runs were performed in a 6 oz. glass reactor containing 0.0014 mole of palladium chloride and 0.05 mole of anhydrous cupric chloride in 1.22 mole (50 ml) of methanol. A complete cycle consisted of (1) reacting the methanol with the ethylene at 150 psig and 90°C. for 15 minutes, (2) distilling the product from the reaction mixture and replenishing the co-distilled methanol and (3) regenerating the catalyst system with oxygen at 150 psig and 65°C. for 15 minutes. Six and one-half cycle runs gave the following yields of 1,1-dimethoxyethane: 88 percent, 84 percent, 100 percent, 103 percent, 95 percent, 114 percent and 98 percent respectively. Acetaldehyde, butenes, methyl chloride, 1,1-dimethoxymethane and 1-chloro-2-methoxyethane were present as side products.

Under the same conditions, methanol was replaced with ethanol and good yields of diethyl acetal were obtained along with small amounts of acetaldehyde and ethyl vinyl ether.

In one experiment, 0.21 mole of the product of the preceding process, 1,1-diethoxyethane, and 0.11 mole of glycerol, along with a trace of sulfosalicyclic acid as a catalyst, were equilibrated overnight under reflux. The ethanol and excess acetal were distilled from the reaction mixture. A mixture of compounds I, II, and III in 20–30 percent yield, as determined by gas chromatography, was found in the reaction product. The major component, however, was a mixture of glycerol acetals.

In another experiment, 1.7 moles of 1,1-diethoxyethane, 0.85 mole of glycerol and 0.2 gram of sulfosalicyclic acid catalyst were equilibrated at reflux temperature for 16 hours. The ethanol which was formed in the reaction and the excess acetal were slowly distilled from the reaction mixture, leaving a mixture of glycerol acetals and glycerol acetal dimers I, II, and III. Distillation of the crude products, after neutralization with anhydrous potassium carbonate, yielded three fractions. Fraction A boiled from 62° to 85°C., at 8 mm Hg pressure, and was present in 50 percent yield. This product was determined to be glycerol acetal. Fraction B boiled, at the same pressure, from 85° to 100°C. The yield was not determined. It is believed that this mixture was a mixture of glycerol acetals and the glycerol acetal dimers I, II and III. Fraction C boiled from 120°C. to 135°C., at 8 mm Hg, and was present in 30 percent yield. This fraction was determined to contain the desired products, I, II and III along with a small amount of trans-2-methyl-1,3-dioxane-5-ol. Yields are based on glycerol.

In a further experiment, 0.054 mole of glycerol and 0.108 mole of 1,1-diethoxyethane and a trace of p-toluene sulfonic acid catalyst were refluxed for 1 hour in a small round bottomed flask. The ethanol-acetal azeotropic mixture was distilled from the reaction mixture to yield 9.36 grams of the distillate. The above process was repeated with the addition of another 0.108 mole of 1,1-diethoxyethane. The second distillation yielded 13.2 grams of liquid. The reaction mixture was neutralized with potassium carbonate and analyzed by gas chromatography using methyl benzoate as an internal standard. A yield of 52 percent glycerol acetal dimers, products I, II and III, based on glycerol, was obtained from this reaction.

Under reaction conditions similar to the preceding experiment, 1,1-diethoxyethane was added in 4 increments of which the first increment was 0.081 mole and the 3 succeeding increments were 0.04 mole of 1,1-diethoxyethane. The reaction was performed by equilibrating the mixture at reflux for approximately 1 hour and then distilling the ethanol-acetal mixture from the reaction flask. Samples taken after each distillation showed 9 percent yield of the glycerol acetal dimer after the first distillation, 63 percent yield after the second distillation, 87 percent yield after the third distillation and 88.3 percent yield of the glycerol acetal dimers I, II and III upon final analysis.

A similar experiment using six additions of 1,1-dimethoxyethane yielded similar results.

The glycerol acetal dimers were also prepared by reacting acetaldehyde with glycerol in a 3:2 molar ratio. The water formed during the reaction was removed by azeotropic distillation with benzene using a Dean-Stark trap. The yield of glycerol acetal dimers was 43 percent. The reaction mixture comprised 15.4 grams of acetaldehyde, 20.2 grams of glycerol, 0.2 gram of p-toluenesulfonic acid and 50 ml of benzene.

Vinyl glycerol acetal synthesis, step three, was accomplished through vapor phase pyrolysis of the glycerol acetal dimers of the preceding step over an acid catalyst, e.g., sodium dihydrogen phosphate.

A feed stock of a mixture of the glycerol acetal dimers I, II and III was fed at a 4 cc/hr. rate of 10 glycerol acetal dimer in dioxane and a 100 cc/min. nitrogen purge flow rate over a sodium dihydrogen phosphate catalyst. At 250°C. with an 11 second contact time the conversion was almost quantitative but the selectivity to the vinyl glycerol acetal was comparatively poor, being approximately 30 percent. Considerable amounts of acetaldehyde, acrolein, and water were observed in the offgas. At 225°C., the conversion was not quantitative but the selectivity to the vinyl cyclic acetals was higher, approximately 44 percent. At 200°C., and a 15 second contact time, the selectivity to the vinyl glycerol acetal was approximately 60 percent and at 175°C. the selectivity to the vinyl glycerol acetal was 63 percent as determined by gas chromatographic analysis.

A feed comprising a pure mixture of glycerol acetal dimers I, II, and III, a temperature of 200°C., a nitrogen purge rate of 100 cc's/min. and a feed rate of 3.9 cc's/hr. yielded a conversion rate of approximately 90 percent. The selectivity to vinyl glycerol acetal was approximately 84 percent.

0.5 gram of the product of the catalystic pyrolysis reaction of the preceding step was mixed with 1.8 grams of normal pentane and 3.8 grams of glycerol in a test tube and the contents were mixed by shaking. Examination of the respective layers showed that the vinyl glycerol acetals were concentrated in the pentane phase and the glycerol acetal was concentrated in the glycerol layer. The vinyl glycerol acetal mixture was separated from pentane by distillation and the glycerol acetal in the glycerol phase is recycled therewith to form more of the glycerol acetal dimer.

The scope of catalysts useful for converting acetals to vinyl compounds according to the reaction

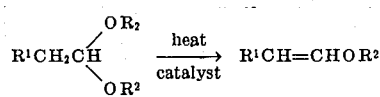

wherein $R^1$ is a lower alkyl or hydrogen and $R^2$ may be alkyl, aryl, aralkyl, cycloalkyl, cycloakenyl, carboxyl, etc., and may be homocyclic or heterocyclic compounds, e.g., cyclic acetals, as illustrated by the catalytic pyrolysis of diallyl acetal to form allyl vinyl ether. In addition to sodium dihydrogen phosphate, silica gel, molecular sieves, charcoal, and aluminum phosphate at temperatures from 125° to 300°C. and catalyst contact times on the order of 0.1 to 10.0 seconds give yields of as high as 93 mole percent conversion of the acetal to the allyl vinyl ether.

The vinyl glycerol acetal products IV and V may be separated from each other by distillation under inert conditions and reduced pressure or they may be polymerized together.

Polymerization may be accomplished using standard techniques and known catalysts and conditions. For example, polymerization of the vinyl monomers of this invention can be accomplished using a peroxide catalyst, e.g., cumene hydroperoxide, in hexane under reflux, (about 60°C.) for 3 to 5 days. The polymer is precipitated with ethanol. Similar results are obtainable using free radical initiators of the type previously discussed. Chlorinated solvents can be used also but tend to lower the molecular weight because of chain transfer.

Lewis acid catalysts, e.g., $BF_3$, $AlCl_3$ and $FeCl_3$, in anhydrous aprotic media, such as ethyl ether or propane, at temperatures of from —60° to 80°C. can be used to slowly polymerize the subject monomers to a relatively high molecular weight crystalline polymer. Reaction times of greater than 24 hours are required.

Ziegler-Natta catalysts, e.g., $TiCl_4$-$AlR_3$ (where R is a lower alkyl group such as ethyl or methyl), dialkylaluminum halide-transition metal halide, and $\pi$-allyl complexes such as Bis-$\pi$-crotyl nickel, may be used at temperatures in the range of —80°C. for periods longer than about 24 hours to form crystalline polymers from the subject vinyl monomers.

Grignard catalysts, alkyl magnesium halides for example, can be used at higher temperatures, e.g., in the range of 80° C., and shorter times, e.g., about 6 hours, to produce polymers from the subject vinyl monomers in a solvent such as cyclohexane under an inert atmosphere such as $N_2$.

The particular catalyst and reaction conditions will, according to conventional polymerization practice, depend to a large extent upon the type of polymer or copolymer of the subject vinyl monomers which is desired. The molecular weight, and hence the properties, of the polymers and copolymers of tee subject monomers in any of the foregoing polymerizations can be controlled by adjusting the monomer to initiator ratio (M/I). For example, an M/I ratio of less than 50 produces a polymer or copolymer which is a light to viscous oil while an M/I ratio of greater than about 50 produces a polymer or copolymer which is a gum to a crystalline solid. These polymers are useful as flocculent aids, coatings, film formers, etc., depending upon the polymerization conditions. Except for the necessity of avoiding catalysts and conditions which will cleave the cyclic etheric portion of the monomer, no special polymerization problems are known.

Flocculent aids and modified polymers are produced by acid hydrolysis of the polymer to produce free hydroxyl groups on the polymer exemplified by the following reaction scheme, using a simple unsubstituted polymer of the type described:

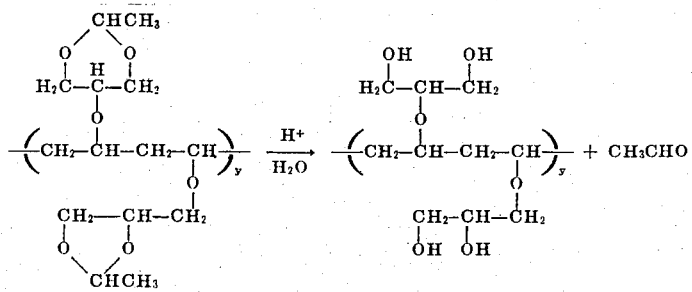

wherein y is a positive integer from 1 to about 1,000.

Because of the free hydroxyl groups, the polymer is highly hydrophilic and is capable of reacting to form modified and cross-linked polymers by reaction with acid anhydrides, e.g., phthalic anhydride, etc., to form ester-linked side chains. Liquid polyester type casting compounds can be produced using a low molecular weight polymer of the above type in combinations with dicarboxylic acids, di-acid chlorides, acid di-anhydrides, methyl esters of dicarboxylic acids, etc.

Other applications for the monomers of this invention, the polymers produced therefrom, and modifications of the processes and compounds of this invention will be obvious from the foregoing to those skilled in the art. It is expected that such adaptations will be made without departing from the spirit and scope of the invention as defined in the claims which follow.

We claim:

1. The process for producing vinyl monomers which comprises:

reacting a compound selected from the class consisting of

and

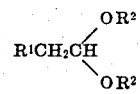

wherein $R^1$ and $R^2$ are hydrogen or lower alkyl or not more than two carbon atoms, with a polyol selected from the group consisting of glycerol, 1,2,6-hexanetriol, 1,3,6-hexanetriol, sorbitol, pentaerythritol, diglycerol, 1,1,1-trimethylol propane and 1,4,7-heptanetriol, and mixtures thereof, said reaction forming addition acetal dimers containing three $R^1CH_2C=$groups per two polyol groups, and pyrolizing said acetal dimers at temperatures of from about 150°C. to about 300°C. in the presence of a catalyst selected from the group consisting of sodium dihydrogen phosphate, aluminum phosphate, molecular sieves, silica gel, and charcoal with catalyst contact time of from about 1 to about 100 seconds to produce an acid-hydrolizable cyclic acetal compound having an oxyvinyl substitutent.

2. The process of claim 1 wherein the polyol is a glycerol.

3. The process of claim 2 wherein the polyol is glycerine.

4. The process of claim 3 wherein the catalyst is dihydrogen sodium phosphate.

5. The process of claim 4 wherein the $R^1$ is hydrogen.

6. The process of claim 5 wherein the temperature is within a range from 175° to 250°C. and the acetal dimer vapor is pyrolyzed in a nitrogen carrier gas.

* * * * *